(12) United States Patent
Liszkai et al.

(10) Patent No.: US 9,997,262 B2
(45) Date of Patent: Jun. 12, 2018

(54) INTEGRAL REACTOR PRESSURE VESSEL TUBE SHEET

(71) Applicant: NuScale Power, LLC, Corvallis, OR (US)

(72) Inventors: Tamas Liszkai, Corvallis, OR (US); Seth Cadell, Corvallis, OR (US); Alex Kruskamp, Corvallis, OR (US); Matthew Mallett, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 1358 days.

(21) Appl. No.: 14/260,866

(22) Filed: Apr. 24, 2014

(65) Prior Publication Data

US 2018/0005712 A1 Jan. 4, 2018

Related U.S. Application Data (60) Provisional application No. 61/921,046, filed on Dec. 26, 2013.

(51) Int. Cl.
| | |
|---|---|
| *G21C 13/02* | (2006.01) |
| *G21C 15/12* | (2006.01) |
| *G21C 15/16* | (2006.01) |
| *G21C 1/32* | (2006.01) |

(52) U.S. Cl.
CPC ............ *G21C 15/12* (2013.01); *G21C 13/02* (2013.01); *G21C 15/16* (2013.01); *G21C 1/322* (2013.01)

(58) Field of Classification Search
CPC .......... G21C 1/32; G21C 1/322; G21C 13/02; G21C 15/16; F22B 1/023

USPC .................. 376/293, 294, 395, 399, 406
See application file for complete search history.

(56) References Cited

U.S. PATENT DOCUMENTS

| | | | | |
|---|---|---|---|---|
| 4,072,563 A | * | 2/1978 | McDonald | G21C 1/322 376/406 |
| 4,098,329 A | * | 7/1978 | Culver | F28D 7/1669 376/402 |
| 5,102,616 A | * | 4/1992 | Gardner | G21C 1/322 376/406 |
| 5,349,617 A | * | 9/1994 | Gautier | G21C 15/18 376/406 |
| 6,357,114 B1 | | 3/2002 | Tang et al. | |
| 6,536,252 B1 | | 3/2003 | Waring | |

(Continued)

FOREIGN PATENT DOCUMENTS

| | | |
|---|---|---|
| CN | 102272856 A | 12/2011 |
| CN | 103077751 A | 5/2013 |

*Primary Examiner* — Jack W Keith
*Assistant Examiner* — Daniel Wasil
(74) *Attorney, Agent, or Firm* — Schwabe Williamson & Wyatt/SFC/NuScale (57) ABSTRACT

A thermal control system for a reactor pressure vessel comprises a plate having a substantially circular shape that is attached to a wall of the reactor pressure vessel. The plate divides the reactor pressure vessel into an upper reactor pressure vessel region and a lower reactor pressure vessel region. Additionally, the plate is configured to provide a thermal barrier between a pressurized volume located within the upper reactor pressure vessel region and primary coolant located within the lower reactor pressure vessel region. One or more plenums provide a passageway for a plurality of heat transfer tubes to pass through the wall of the reactor pressure vessel. The plurality of heat transfer tubes are connected to the plate.

20 Claims, 9 Drawing Sheets

(56) References Cited

U.S. PATENT DOCUMENTS

| | | |
|---|---|---|
| 6,708,651 B1 | 3/2004 | Sun |
| 8,681,928 B2 | 3/2014 | Steinmoeller et al. |
| 8,744,035 B1 | 6/2014 | Young et al. |
| 2009/0161812 A1 | 6/2009 | Reyes, Jr. |
| 2012/0076254 A1 | 3/2012 | Malloy |
| 2012/0111287 A1 | 5/2012 | Williams et al. |
| 2012/0263270 A1* | 10/2012 | Malloy ................. G21C 13/02 376/396 |
| 2012/0275558 A1* | 11/2012 | Cinotti ................. G21C 1/322 376/406 |
| 2013/0044853 A1* | 2/2013 | Kim ..................... G21C 1/32 376/384 |
| 2013/0121453 A1* | 5/2013 | Shargots ............... G21C 15/18 376/282 |

* cited by examiner

INTEGRAL REACTOR PRESSURE VESSEL TUBE SHEET

STATEMENT OF RELATED MATTER

This application claims priority to U.S. Provisional Application No. 61/921,046, filed on Dec. 26, 2013, which is herein incorporated by reference in its entirety.

TECHNICAL FIELD

This application relates to the field of power generation, including power systems comprising a steam generator tube assembly.

BACKGROUND

Reactor performance, including the ability to efficiently generate electricity from a steam generator, may be influenced or otherwise affected by a variety of design considerations. For example, the number, length, and wall thickness of steam generator tubes may affect the decay heat removal and flow rate associated with a steam generator system. Similarly, the overall volume and wall thickness associated with a containment structure may determine, in part, a normal operating pressure or an allowable system pressure of a power plant.

In addition to design considerations related to efficiency, the various system components associated with the power plant must often meet strict safety requirements and regulatory codes. Power plants which operate with liquid and/or steam contained under pressure are typically designed to withstand pressures which may be in excess of normal operating conditions in order to keep the components from failing during an over-pressurization event or accident.

Invariably, the safety requirements and regulatory codes often result in a more robust design of the components, which tends to result in an increased amount of material used in the manufacture of certain components. As the size or weight of the components increase, this similarly increases the associated costs of manufacturing and transportation during construction of the reactor module, thus adding to the overall cost of the power plant and the electricity that it is designed to generate. The present application addresses these and other problems.

SUMMARY

A thermal control system for a reactor pressure vessel may comprise a plate having a substantially circular shape that is attached to a wall of the reactor pressure vessel. The plate may divide the reactor pressure vessel into an upper reactor pressure vessel region and a lower reactor pressure vessel region. Additionally, the plate may be configured to provide a thermal barrier and/or a liquid barrier between a pressurized volume located within the upper reactor pressure vessel region and primary coolant located within the lower reactor pressure vessel region. One or more plenums may be configured to provide a passageway for a plurality of heat transfer tubes to pass through the wall of the reactor pressure vessel. The plurality of heat transfer tubes may be connected to the plate.

DETAILED DESCRIPTION

In order to facilitate the review of and provide for a better understanding of the various embodiments disclosed herein, a number of terms may be represented by an acronym or abbreviation including, but not limited to: Emergency Core Cooling System (ECCS), Chemical Volume Control System (CVCS), Containment Vessel (CNV), Feed Water (FW), Pressurizer (PZR), Reactor Coolant System (RCS), Reactor Pressure Vessel (RPV), and Steam Generator (SG). Additionally, various examples disclosed or referred to herein may be operated consistent with, or in conjunction with, features found in one or more of U.S. application Ser. No. 12/393,577, U.S. application Ser. No. 12/397,481, and U.S. application Ser. No. 12/939,957, which are herein incorporated by reference in their entirety.

Figure 1:
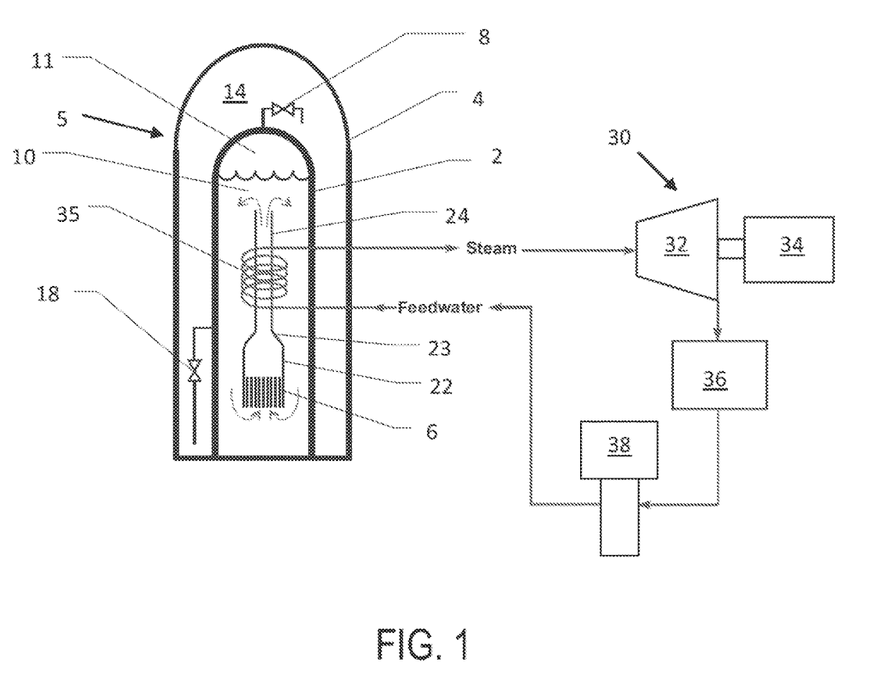
FIG. 1 illustrates an example nuclear reactor module comprising a reactor core surrounded by a reactor pressure vessel.

FIG. 1 illustrates an example nuclear reactor module 5 comprising a reactor core 6 surrounded by a reactor pressure vessel 2. Coolant 10 in the reactor pressure vessel 2 surrounds the reactor core 6. The reactor core 6 may be located in a shroud 22 which surrounds reactor core 6 about its sides. When coolant 10 is heated by reactor core 6 as a result of fission events, coolant 10 may be directed from shroud 22 up into an annulus 23 located above reactor core 6, and out of a riser 24. This may result in additional coolant 10 being drawn into shroud 22 to be heated in turn by reactor core 6, which draws yet more coolant 10 into shroud 22. The coolant 10 that emerges from riser 24 may be cooled down and directed towards the outside of the reactor pressure vessel 2 and then returned to the bottom of the reactor pressure vessel 2 through natural circulation. Pressurized vapor 11 (e.g., steam) may be produced in the reactor pressure vessel 2 as coolant 10 is heated.

A heat exchanger 35 may be configured to circulate feedwater and/or steam in a secondary cooling system 30 in order to generate electricity with a turbine 32 and a generator 34. In some examples, the feedwater passes through the heat exchanger 35 and may become super heated steam. The secondary cooling system 30 may include a condenser 36 and a feedwater pump 38. In some examples, the feedwater and/or steam in the secondary cooling system 30 are kept isolated from the coolant 10 in the reactor pressure vessel 2, such that they are not allowed to mix or come into direct contact with each other.

Reactor pressure vessel 2 may be surrounded by a containment vessel 4. In some examples, containment vessel 4 may be placed in a pool of water, for example as located below ground level. Containment vessel 4 is configured to prohibit the release of coolant 10 associated with reactor pressure vessel 2 to escape outside of containment vessel 4 and/or into the surrounding environment. In an emergency situation, vapor 11 may be vented from the reactor pressure vessel 2 through a valve 8 into containment vessel 4, and/or coolant 10 may be released through a blowdown valve 18. The rate of release of vapor 11 and/or coolant 10 into containment vessel 4 may vary according to the pressure within reactor pressure vessel 2. In some examples, a decay heat associated with reactor core 6 may be removed, at least in part, through a combination of condensation of vapor 11 on the inner walls of containment vessel 4 and/or by the suppression of coolant 10 released through blowdown valve 18.

Containment vessel 4 may be approximately cylindrical in shape. In some examples, containment vessel 4 may have one or more ellipsoidal, domed, or spherical ends. Containment vessel 4 may be welded or otherwise sealed to the environment, such that liquids and/or gases are not allowed to escape from, or enter into, containment vessel 4. In various examples, reactor pressure vessel 2 and/or containment vessel 4 may be bottom supported, top supported, supported about its center, or any combination thereof.

An inner surface of reactor pressure vessel 2 may be exposed to a wet environment comprising coolant 10 and/or vapor 11, and an outer surface of reactor pressure vessel 2 may be exposed to a substantially dry environment in some examples and/or modes of operation. The reactor pressure vessel 2 may comprise and/or be made of stainless steel, carbon steel, other types of materials or composites, or any combination thereof. Additionally, reactor pressure vessel 2 may include cladding and/or insulation.

Containment vessel 4 may substantially surround the reactor pressure vessel 2 within a containment region 14. Containment region 14 may comprise a dry, voided, and/or gaseous environment in some examples and/or modes of operation. In some examples, one or both of reactor pressure vessel 2 and containment vessel 4 may be exposed to coolant and/or water during certain modes of operation such as refueling, shutdown, or transport. Containment region 14 may comprise an amount of air, a nobel gas such as Argon, other types of gases, or any combination thereof. In some examples, containment region 14 may be maintained at or below atmospheric pressure, for example at a partial vacuum. In other examples, containment region 14 may be maintained at a substantially complete vacuum. Any gas or gasses in containment vessel 4 may be evacuated and/or removed prior to operation of reactor module 5.

Certain gases may be considered non-condensable under operating pressures that are experienced within a nuclear reactor system. These non-condensable gases may include hydrogen and oxygen, for example. During an emergency operation, steam may chemically react with the fuel rods to produce a high level of hydrogen. When hydrogen mixes with air or oxygen, this may create a combustible mixture. By removing a substantial portion of the air or oxygen from containment vessel 4, the amount of hydrogen and oxygen that is allowed to mix may be minimized or eliminated.

Any air or other gases that reside in containment region 14 may be removed or voided when an emergency condition is detected. The gases that are voided or evacuated from the containment region 14 may comprise non-condensable gases and/or condensable gases. Condensable gases may include any steam that is vented into containment region 14.

During an emergency operation, whereas vapor and/or steam may be vented into containment region 14, only a negligible amount of non-condensable gas (such as hydrogen) may be vented or released into containment region 14. It may be possible to assume from a practical standpoint, that substantially no non-condensable gases are released into containment region 14 together with the vapor. Accordingly, in some examples, substantially no hydrogen gas is vented into the containment region 14 together with the vapor, such that the levels and/or amounts of hydrogen together with any oxygen that may exist within the containment region 14 are maintained at a non-combustible level. Additionally, this non-combustible level of oxygen-hydrogen mixture may be maintained without the use of hydrogen recombiners. In some examples, separate vent lines from the reactor pressure vessel 2 may be configured to remove non-condensable gases during start up, heat up, cool down, and/or shut down of the reactor.

Removal of convective heat transfer in air occurs generally at about 50 torr (50 mmHG) of absolute pressure, however a reduction in convective heat transfer may be observed at approximately 300 torr (300 mmHG) of absolute pressure. In some examples, containment region 14 may be provided with, or maintained below, a pressure of 300 torr (300 mmHG). In other examples, containment region 14 may be provided with, or maintained below, a pressure of 50 torr (50 mmHG). In some examples, containment region 14 may be provided with and/or maintained at a pressure level which substantially inhibits all convective and/or conductive heat transfer between reactor pressure vessel 2 and containment vessel 4. A complete or partial vacuum may be provided and/or maintained by operating a vacuum pump, steam-air jet ejector, other types of evacuation devices, or any combination thereof.

By maintaining containment region 14 in a vacuum or partial vacuum, moisture within containment region 14 may be eliminated, thereby protecting electrical and mechanical components from corrosion or failure. Additionally, the vacuum or partial vacuum may operate to draw or pull coolant into the containment region 14 during an emergency operation (e.g. over-pressurization or over-heating event) without the use of a separate pump or elevated holding tank. The vacuum or partial vacuum may also operate to provide a way to flood or fill containment region 14 with coolant 10 during a refueling process.

Valve 8 may be mounted on reactor pressure vessel 2 for venting the coolant 10 and/or vapor 11 into containment vessel 4 during an emergency operation. Valve 8 may be connected or mounted directly to an outer wall of reactor pressure vessel 2, without any intervening structures such as piping or connections. In some examples, valve 8 may be welded directly to reactor pressure vessel 2 to minimize the likelihood of any leaking or structural failures. Valve 8 may comprise a Venturi flow valve configured to release vapor 11 into the containment vessel 4 at a controlled rate. The condensation of vapor 11 may reduce pressure in containment vessel 4 at approximately the same rate that the vented vapor 11 adds pressure to containment vessel 4.

Coolant 10 that is released as vapor 11 into containment vessel 4 may condense on an inner surface of containment vessel 4 as a liquid, such as water. The condensation of the vapor 11 may cause the pressure in containment vessel 4 to decrease, as the vapor 11 is transformed back into liquid coolant. A sufficient amount of heat may be removed through the condensation of vapor 11 on the inner surface of containment vessel 4 to control the removal of decay heat from reactor core 6.

The condensed coolant 10 may descend to the bottom of containment vessel 4 and collects as a pool of liquid. As more vapor 11 condenses on the inner surface of containment vessel 4, the level of coolant 10 within containment vessel 4 may gradually rise. Heat stored in the vapor 11 and/or coolant 10 may be transferred through the walls of the containment vessel 4 to the surrounding environment. By substantially removing gases from the containment region 14, the initial rate of condensation of vapor 11 on the inner surface of containment vessel 4 may be increased by virtue of the evacuated gases. Gases that would normally accumulate at the inner surface of containment vessel 4 to inhibit the condensation of coolant 10 are either at such low levels or are swept from the inner surface due to the natural convection of the coolant 10, that the rate of condensation may be maximized. Increasing the rate of condensation may in turn increase the rate of heat transfer through containment vessel 4.

A vacuum within the containment region 14 may act as a type of thermal insulation during normal operation of the reactor module, thereby retaining heat and energy in reactor pressure vessel 2 where it can continue to be utilized for power generation. As a result, less material insulation may be used in the design of reactor pressure vessel 2. In some examples, a reflective insulation may be used instead of, or in addition to, conventional thermal insulations. Reflective insulation may be included on one or both of reactor pressure vessel 2 or containment vessel 4. The reflective insulation may be more resistant to water damage compared to conventional thermal insulation. In addition, reflective insulation may not impede a transfer of heat from reactor pressure vessel 2 as much as the conventional thermal insulation during an emergency condition. For example, an exterior stainless steel surface of reactor pressure vessel 2 may come into direct contact with any coolant located in containment region 14.

In some types of reactors, conversion and regulation elements are implemented in separate pressure vessels such as the reactor pressure vessel (RPV), pressurizer (PZR) and steam generator (SG).

Figure 2:
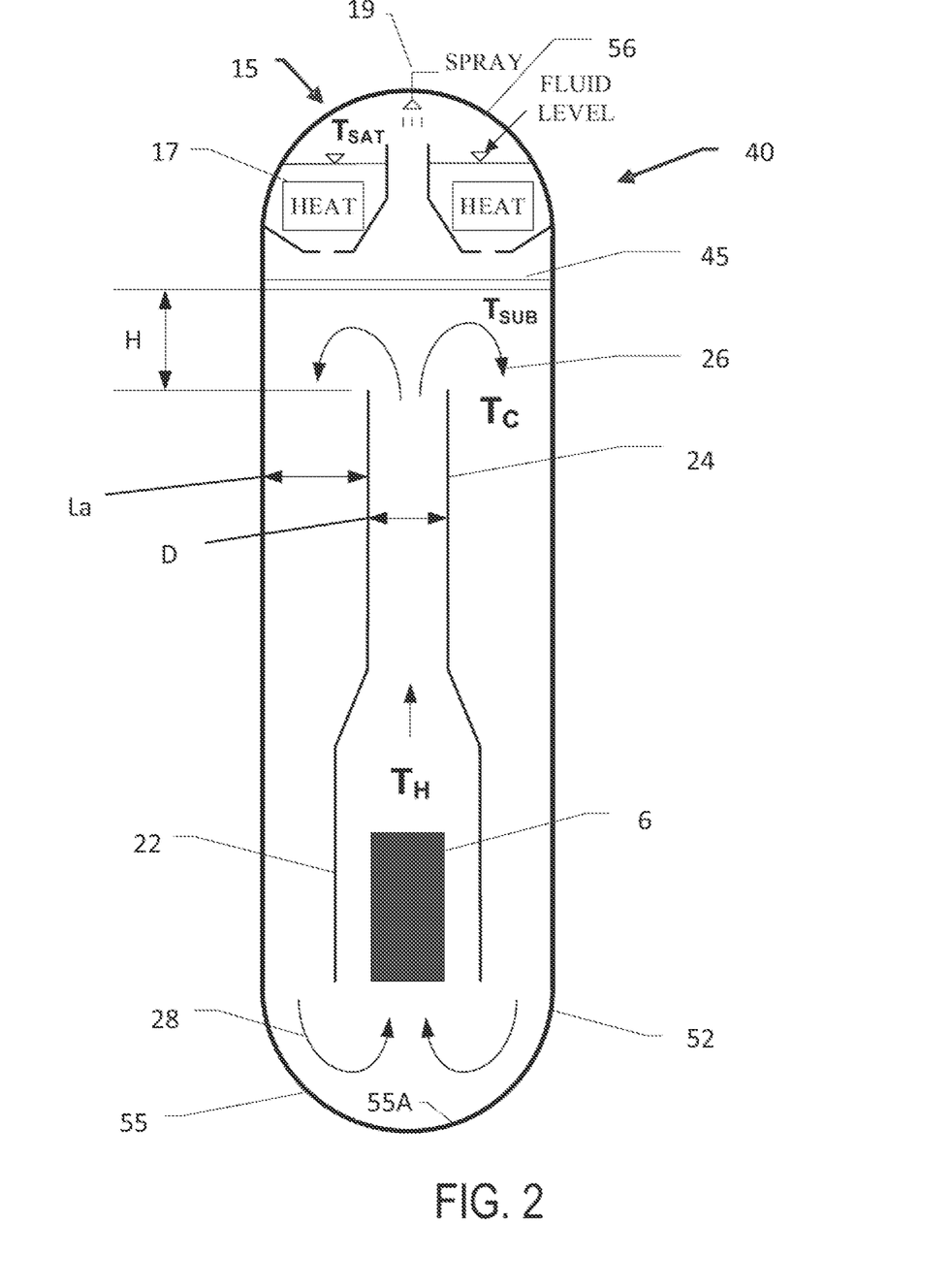
FIG. 2 illustrates a cross-sectional view of an example system comprising a reactor pressure vessel and a reactor pressure vessel baffle plate.

FIG. 2 illustrates a cross-sectional view of an example system 40 comprising a reactor pressure vessel 52 and a reactor pressure vessel baffle plate 45. Reactor pressure vessel 52 may contain a reactor core 6 located near a bottom end 55 of the reactor pressure vessel 52. A riser section 24 is located above the reactor core 6, wherein coolant circulates past the reactor core 6 to become high-temperature coolant $T_H$ and then continues up through the riser section 24 where it is directed back down the annulus and cooled off by a heat exchanger 35 (FIG. 1) to become low-temperature coolant $T_C$.

The reactor pressure vessel baffle plate 45 may be configured to direct the coolant (shown as coolant flow 26) towards the bottom end 55 of the reactor pressure vessel 52. A surface of the reactor pressure vessel baffle plate 45 may come into direct contact with and deflect the coolant that exits the riser section 24. In some examples, the reactor pressure vessel baffle plate 45 may be made of stainless steel or other materials and/or may be formed into an ellipsoidal shaped surface.

In some examples, the bottom end 55 of the reactor pressure vessel 52 comprises an ellipsoidal, domed, concave, or hemispherical portion 55A, wherein the ellipsoidal portion 55A directs the coolant (shown as coolant flow 28) towards the reactor core 6. The ellipsoidal portion 55A may increase flow rate and promote natural circulation of the coolant through the reactor core 6.

An optimization of the coolant flow 26 may be obtained according to a ratio of the distance H between the top of the riser section 24 and the reactor pressure vessel baffle plate 45 and the relative distance D between the walls of the riser section 24, wherein the dimension La represents the distance between the outside of the riser 24 and the inside surface of the reactor pressure vessel 52. In one embodiment, the distance D equals the diameter of the riser section 24. An optimized coolant flow ratio may be represented as H/D and/or by the ratio of the area inside of the riser (A1) to the area inside the annulus (A2). In one embodiment, the optimized coolant flow ratio H/D comprises a value 0.1 and 2.0, and the flow ratio A1/A2 comprises a value between/approximately 1 and 10. Further optimization of the coolant flow 26 may be obtained by modifying a radius of curvature of the the reactor pressure vessel baffle plate 45 to eliminate/minimize boundary layer separation and stagnation regions.

The reactor pressure vessel baffle plate 45 is illustrated as being located between the top of the riser section 24 and a pressurizer region 15. The pressurizer region 15 is shown as comprising one or more heaters 17 and a spray nozzle 19 configured to control a pressure, or maintain a steam dome, within an upper end 56 or head of the reactor pressure vessel 52. Coolant located below the reactor pressure vessel baffle plate 45 may comprise relatively sub-cooled coolant $T_{SUB}$, whereas coolant in the pressurizer region 15 in the upper end 56 of the reactor pressure vessel 52 may comprise substantially saturated coolant $T_{SAT}$. A fluid level of the coolant is shown as being above the reactor pressure vessel baffle plate 45, and within the pressurizer region 15, such that the entire volume between the reactor pressure vessel baffle plate 45 and the bottom 55 of the reactor pressure vessel 52 is full of coolant during normal operation of the system 40.

The reactor pressure vessel baffle plate 45 may be supported by one or more control rod guide tubes or instrumentation structures. The one or more control rod guide tubes or instrumentation structures may be attached to an upper end of the reactor pressure vessel 52, and serve to guide control rods that are inserted into, or removed from, the reactor core 6, or provide support for instrumentation devices located inside the reactor pressure vessel 52. By attaching or suspending the reactor pressure vessel baffle plate 45 from the one or more control rod guide tubes or instrumentation structures, the reactor pressure vessel baffle plate 45 may be free from contacting the sides of the reactor pressure vessel 52.

Figure 3A:
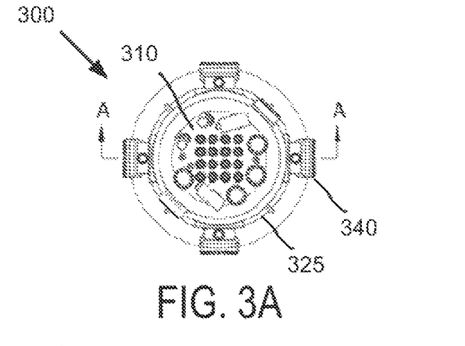
FIG. 3A illustrates a top-view of a reactor module comprising a baffle plate and one or more steam generator nozzles mounted on a reactor pressure vessel.

FIG. 3A illustrates a top-view of a reactor module 300 comprising a PZR baffle plate 310 and one or more steam generator nozzles 340 mounted on a reactor pressure vessel 325.

Figure 3B:
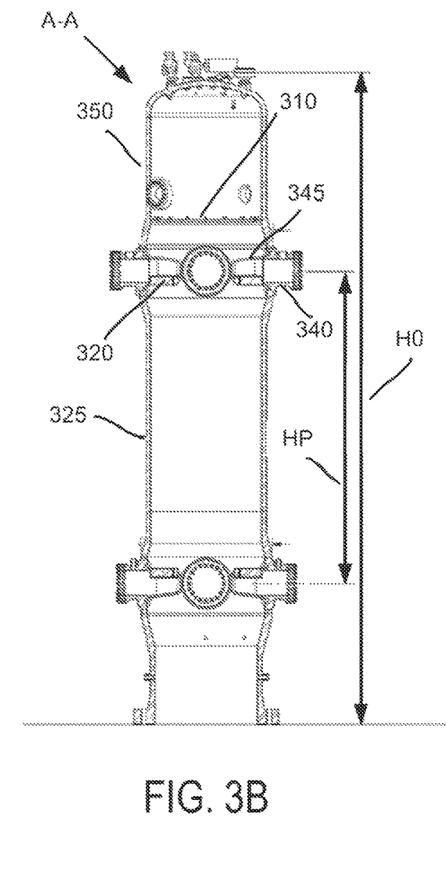
FIG. 3B illustrates a cross-sectional view of the reactor pressure vessel of FIG. 3A.

FIG. 3B illustrates a cross-sectional view A-A of the reactor pressure vessel 325 of FIG. 3A. A PZR head 350 is illustrated as being located above PZR baffle plate 310. The PZR baffle plate 310 is illustrated as being at a higher elevation than the one or more plenums 345. One or more SG tube sheets 320 are illustrated as being located below the PZR baffle plate 310. An overall height H0 of the reactor pressure vessel 325 is shown for purposes of illustration.

Figure 4A:
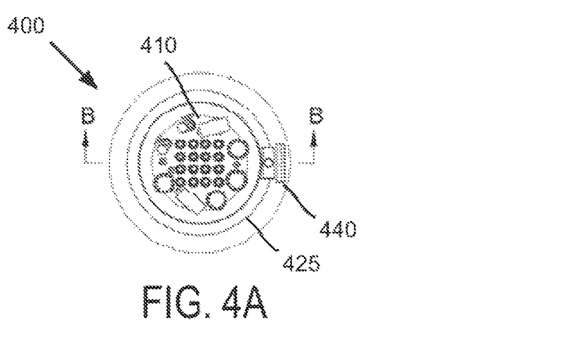
FIG. 4A illustrates a top-view of a reactor module comprising an example integral reactor pressure vessel tube sheet and one or more steam generator nozzles mounted on a reactor pressure vessel.

FIG. 4A illustrates a top-view of a reactor module 400 comprising an integral reactor pressure vessel tube sheet 410 and one or more steam generator nozzles 440 mounted on a reactor pressure vessel 425. In some examples, integral tube sheet 410 may be configured similarly as one or more other example integral tube sheets described in this specification.

Figure 4B:
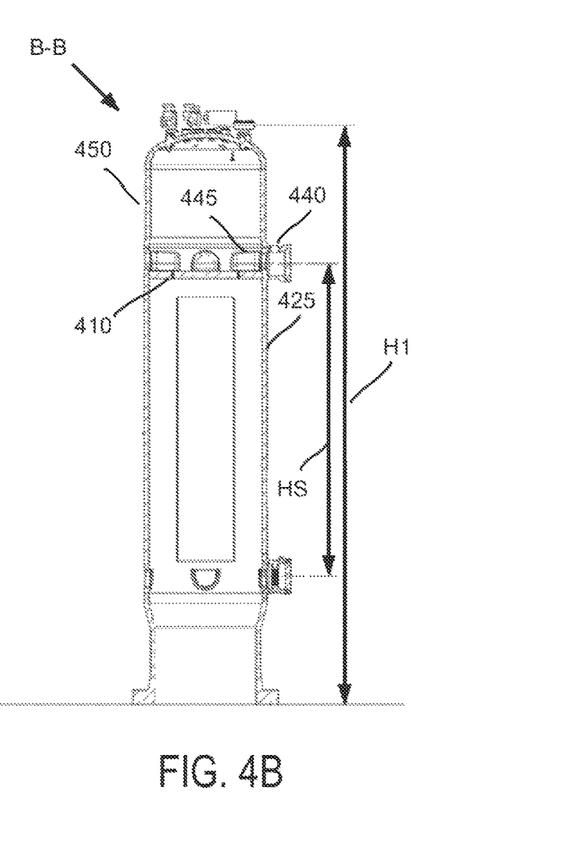
FIG. 4B illustrates a cross-sectional view of the reactor pressure vessel of FIG. 4A.

FIG. 4B illustrates a cross-sectional view B-B of the reactor pressure vessel 425 of FIG. 4A. A PZR head 450 is illustrated as being located above integral tube sheet 410. PZR head 450 may comprise an upper portion of a reactor pressure vessel of reactor pressure vessel 425. In some examples, PZR head 450 may be mounted to a lower portion of the reactor pressure vessel of reactor pressure vessel 425. The outer diameter associated with the upper portion of the reactor pressure vessel may be approximately the same as the outer diameter associated with the lower portion of the reactor pressure vessel. Reactor pressure vessel 425 may be approximately shaped as a cylindrical shaped reactor pressure vessel with one or more dome shaped ends.

An overall height H1 associated with reactor pressure vessel 425 may be less than the overall height H0 associated with reactor pressure vessel 325. In some examples, an approximate height of one or more plenums 445 associated with the one or more steam generator nozzles 440 of reactor pressure vessel 425 may be approximately the same as the height of the one or more plenums 345 of reactor pressure vessel 325. Since reactor pressure vessel 425 does not have a separate PZR baffle plate, such as PZR baffle plate 310 of reactor pressure vessel 325, the height of the PZR head 450 associated with reactor pressure vessel 425 may be less than the height of the PZR head 350 associated with reactor pressure vessel 325. In some examples, the overall height H1 associated with reactor pressure vessel 425 may be less than the overall height H0 associated with reactor pressure vessel 325 by approximately two or more meters.

In some examples, the distance HS between upper and lower plenum in reactor pressure vessel 425 may be approximately the same as the distance HP between upper and lower plenum in reactor pressure vessel 325. However, since the functionality of PZR baffle plate 310 is effectively replaced with integral tube sheet 410, including the fluid/pressure/thermal separation between the upper and lower reactor pressure vessel regions, the overall volume of the lower reactor pressure vessel region beneath integral tube sheet 410 may therefore be less than the corresponding volume of the lower reactor pressure vessel region for reactor pressure vessel 325. Accordingly, the transit time for primary coolant to circulate through the reactor core within reactor pressure vessel 425 may be decreased, providing for increased flow rates, fewer power oscillations, and greater cooling efficiencies.

PZR head 450 may comprise or be configured to interact with at least a portion of a Chemical Volume Control System (CVCS), one or more heaters, and/or an Emergency Core Cooling System (ECCS). The CVCS, heaters, and/or ECCS may be configured to maintain a system pressure level, control coolant chemistry, provide high pressure core cooling, provide makeup flow, other related functions, or any combination thereof. Integral tube sheet 410 may effectively divide the reactor pressure vessel 425 into an upper reactor pressure vessel region comprising PZR head 450 and a lower reactor pressure vessel region comprising a reactor core submerged in a primary coolant. Additionally, integral tube sheet 410 may be configured to provide a thermal and/or liquid boundary between a pressurized volume located within the upper reactor pressure vessel region and the primary coolant located within the lower reactor pressure vessel region. In some examples, integral tube sheet 410 may be configured to provide a pressure boundary between the primary coolant and the secondary coolant systems.

In the reactor pressure vessel 325 illustrated in FIG. 3B, the one or more plenums 345 are located below PZR head 350 and within the lower reactor pressure vessel region of the reactor pressure vessel 325. By effectively combining the PZR baffle plate 310 and SG tube sheets 320 illustrated in FIG. 3B into integrated tube sheet 410, the one or more plenums 445 of reactor pressure vessel 425 are instead located within the upper reactor pressure vessel region associated with PZR head 450. In some examples, four plenums 445 may be mounted to integral tube sheet 410. Additionally, integral tube sheet 410 may be configured to decrease the amount of turbulence in fluid flow of the primary coolant within the lower reactor pressure vessel region as compared to reactor pressure vessel 325 in which the primary coolant passes by and/or through the one or more tube sheets 320 before being deflected back down into the lower reactor pressure vessel region by PZR baffle plate 310. For example, by locating the one or more plenums 445 within PZR head 450, they do not impede or otherwise interfere with the circulation of primary coolant within the lower reactor pressure vessel region.

In some examples, the integral tube sheet 410 may be located at the steam plenum location. The integral tube sheet 410 may be configured to operate as both a SG tube sheet and a PZR baffle plate, thereby eliminating the need for a separate PZR baffle plate. In some examples, the integral tube sheet 410 may be approximately fifteen to twenty centimeters thick, although thinner or thicker dimensions are contemplated herein. The integral tube sheet 410 may be configured to reduce the amount of heat loss from the PZR system to the RPV cooling system.

In some examples, integral tube sheet 410 of reactor pressure vessel 425 may be configured to perform the same or similar functions as PZR baffle plate 310 and SG tube sheets 320 of reactor pressure vessel 325 (FIG. 3B). Additionally, the elevation of integral tube sheet 410 may be approximately the same elevation as SG tube sheets 320. As compared to reactor pressure vessel 325, the volume of PZR head 450 may be substantially reduced as compared to the volume of PZR head 350, by replacing PZR baffle plate 310 and SG tube sheets 320 with a single sheet, namely integral tube sheet 410. Integral tube sheet 410 may provide a pressure boundary between secondary coolant associated with the one or more plenums 445 and steam generator nozzles 440 and the primary coolant located in the lower portion of reactor pressure vessel 425.

In some examples, integral tube sheet 410 may provide a weight reduction of reactor pressure vessel 425, as compared to reactor modules which comprise separate baffle plates and tube sheets. For example, the thickness of integral tube sheet 410 may be less than the combined thickness of PZR baffle plate 310 and one or more SG tube sheets 320. Similarly, by reducing the overall height of reactor pressure vessel 425, less material may be required to manufacture the reactor pressure vessel.

Figure 5:
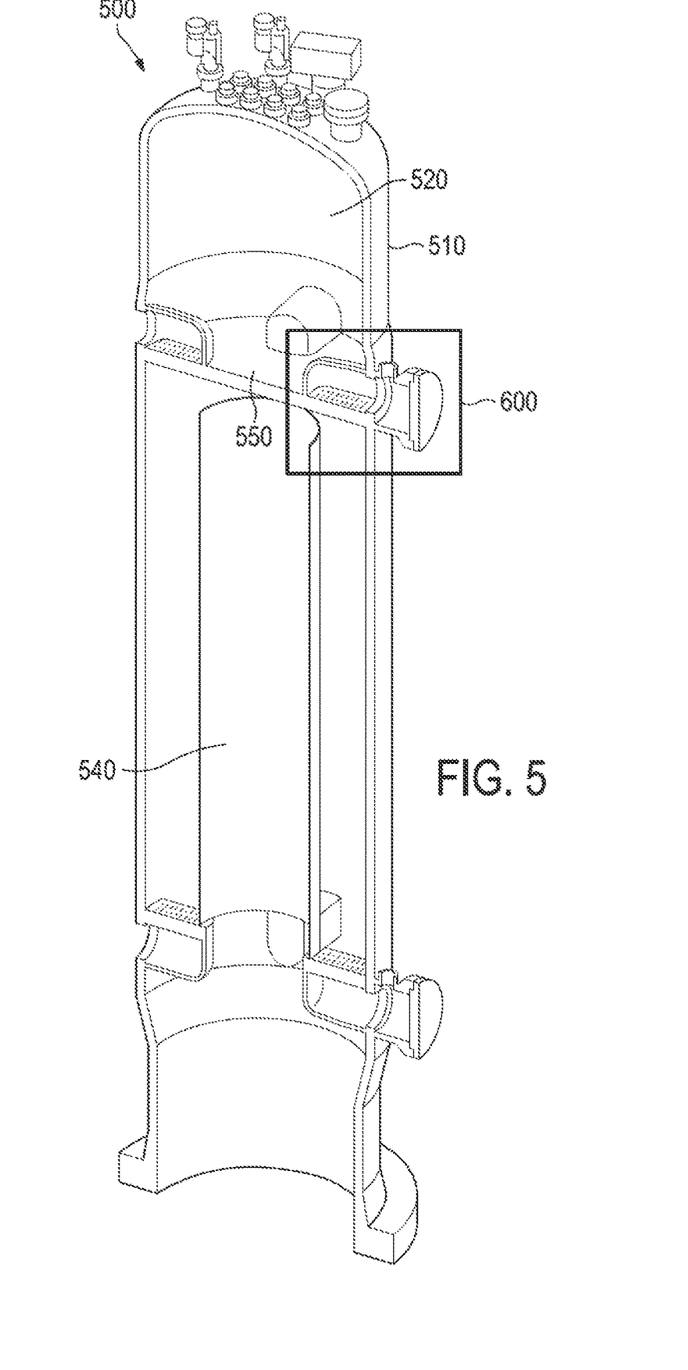
FIG. 5 illustrates a reactor pressure vessel system comprising an example integral reactor pressure vessel tube sheet.

FIG. 5 illustrates a reactor pressure vessel (RPV) system 500 with an example integral reactor pressure vessel tube sheet 550. In some examples, the integral tube sheet 550 may perform some or all of the functions as associated with a pressurizer (PZR) baffle plate, deflector shield, and/or a steam generator (SG) tube sheet. The integral tube sheet 550 may be configured to provide a compact space saving arrangement for the RPV system 500.

In some examples, integral tube sheet 550 may comprise a full disk and/or full sheet located at or near the top portion of a reactor pressure vessel 510. A PZR volume 520 may be located above the integral tube sheet 550 and bounded by the upper RPV shell, container, and/or head. The integral tube sheet 550 may be configured to operate as a PZR baffle plate which separates the PZR fluid, located above integral tube sheet 550, from the reactor coolant system fluid, located below integral tube sheet 550. Integral tube sheet 550 may be configured to allow for an exchange of fluid volumes between the PZR volume 520 and the reactor coolant system. In some examples, the RPV system 500 may not require a separate PZR baffle plate.

The riser 540 may be configured to end and/or terminate below the integral tube sheet 550. A flow of reactor coolant system fluid up riser 540 may turn below the integral tube sheet 550 and descend down around the outside of riser 540 in the transition of the SG tubes. One or more heaters may be located in the PZR volume 520, for example between SG domes associated with one or more plenums. In some examples, the height of riser 540 and/or the height of control rods associated with RPV system 500 may be reduced as compared to a reactor module which comprises separate baffle plates and tube sheets.

RPV system 500 may comprise a thermal control system for reactor pressure vessel 510. In some examples, integral tube sheet 550 may comprise a plate having a substantially circular shape that is attached to a wall of reactor pressure vessel 510. Integral tube sheet 550 may be configured to divide reactor pressure vessel 510 into an upper reactor pressure vessel region and a lower reactor pressure vessel region. The upper reactor pressure vessel region may contain PZR volume 520 and/or a CVCS. The lower reactor pressure vessel region may contain riser 540 and/or a reactor core submerged in primary coolant. Integral tube sheet 550 may be configured to provide a liquid and/or thermal barrier between PZR volume 520 and the primary coolant located within the lower reactor pressure vessel region.

Figure 6:
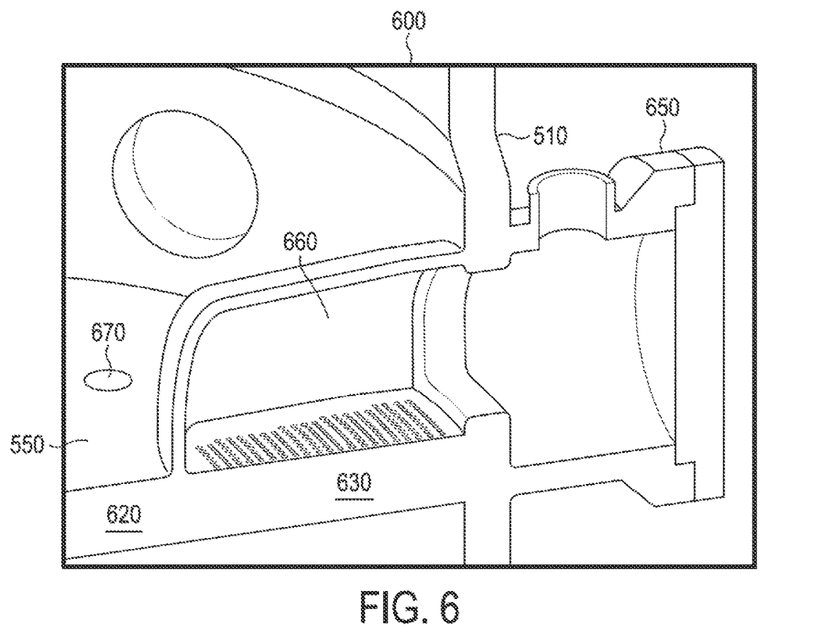
FIG. 6 illustrates an enlarged partial view of the example integral reactor pressure vessel tube sheet of FIG. 5.

FIG. 6 illustrates an enlarged partial view 600 of the example integral reactor pressure vessel tube sheet 550 of FIG. 5. Integral tube sheet 550 may comprise a substantially horizontal plate attached to the wall of RPV 510.

The integral tube sheet 550 may be configured to provide a seal with the inner wall perimeter of RPV 510. Additionally, integral tube sheet 550 may comprise two or more integrated portions, including a PZR baffle portion 620 and a SG tube sheet portion 630. PZR baffle portion 620 may be substantially bounded by the inner wall perimeter of RPV 510 and one or more SG domes, such as SG dome 660. SG dome 660 may be associated with a plenum/steam generator nozzle assembly 650. In some examples, SG tube sheet portion 630 may be located within and/or beneath SG dome 660.

SG dome 660 may be associated with one or more plenums that provide a passageway for a plurality of heat transfer tubes to pass through the wall of RPV 510. The plurality of heat transfer tubes may be connected to integral tube sheet 550 via a number of through-holes located in the integral tube sheet 550. The through-holes are illustrated as passing through SG tube sheet portion 630. Additionally, the one or more plenums associated with SG dome 660 may be welded and/or otherwise attached to integral tube sheet 550. The plurality of heat transfer tubes may be connected to integral tube sheet 550 below the one or more plenum and/or below SG dome 660. The heat transfer tubes may be configured to allow secondary coolant from a steam generation system to pass through integral tube sheet 550 and into the lower reactor pressure vessel region of RPV 510.

Integral tube sheet 550 may comprise a number of orifices 670, illustrated as passing through PZR baffle portion 620, that are configured to controllably allow primary coolant to pass through integral tube sheet 550 into the upper reactor pressure vessel region of RPV 510 and to re-circulate back into the lower reactor pressure vessel region of RPV 510. One or more orifices 670 may be configured, for example in a closed position, to prohibit the primary coolant from passing through integral tube sheet 550. In some examples, both the primary coolant and the secondary coolant pass through integral tube sheet 550 without becoming comingled and/or without being allowed to mix with each other.

In some examples, the integral tube sheet 550 may comprise a solid plate. The integral tube sheet 550 may comprise or substantially consist of a clad low alloy steel, SA-508 low alloy steel, stainless steel, other types of materials, or any combination thereof. Additionally, integral tube sheet 550 may be connected to RPV 510 by a full penetration weld. The integral tube sheet 550 may be welded to a RPV having a similar composition. Welding similar types of materials and/or composition may operate to minimize any thermal stresses which might otherwise develop during operation of the RPV 510.

The weld between the integral tube sheet 550 and the RPV 510 may be located several centimeters from the inner wall of the RPV inner wall to provide space for the weld and/or to minimize distortion of the outermost tube holes due to welding. In some examples, a reactor pressure vessel "bump-out," or area of increased diameter, may be provided to accommodate the welding area. In some examples, an end of the heat transfer tubes may be moved towards the center of the RPV vessel and/or be bent to minimize or eliminate any additional amount of welding space. For example, the heat transfer tubes may be bent away from the RPV wall so they meet the integral tube sheet 550 further inboard. A relatively large integral tube sheet 550 may provide for more flexibility as to how and where to terminate the heat transfer tubes within the plenum/steam generator nozzle assembly 650.

A relatively large access space on top of the integral tube sheet 550 may be configured to provide access for welding, component installation, equipment lay-down, and inspections. Access to the steam dome welds may be provided from two or more sides of the plenum, e.g., through the steam dome covers and/or through the PZR heater openings.

In some examples, the integral tube sheet 550 and associated tubes may be assembled inside the RPV 510. Radial cantilever beams for the tube supports may be configured to fit under the integral tube sheet 550, and in some examples the support bars may be welded to the cantilever beam and/or to the integral tube sheet 550 directly underneath. Welding the support bars to the integral tube sheet 550 may reduce or eliminate pressure boundary welds and provide more rigidity to the support bars.

The integral tube sheet 550 may be configured to pass through to the outer diameter of the RPV 510. In some examples, the integral tube sheet 550 may contain integral flanges that are welded to upper and lower vessel cylinders. The lower cylinder may be welded to the integral tube sheet 550 flange before inserting the heat transfer tubes. In some examples, the tubing operations may be performed inside the vessel. The integral tube sheet 550 may comprise a substantially cylindrical disc that is welded to a ring buildup on the inner diameter of RPV 510. The welding may be completed prior to inserting the heat transfer tubes. In some examples, the integral tube sheet 550 may comprise an ellipsoidal, domed, concave, or hemispherical shaped lower surface adjacent to the lower reactor pressure vessel region to facilitate the flow and/or recirculation of the primary coolant through the reactor core.

Figure 7:
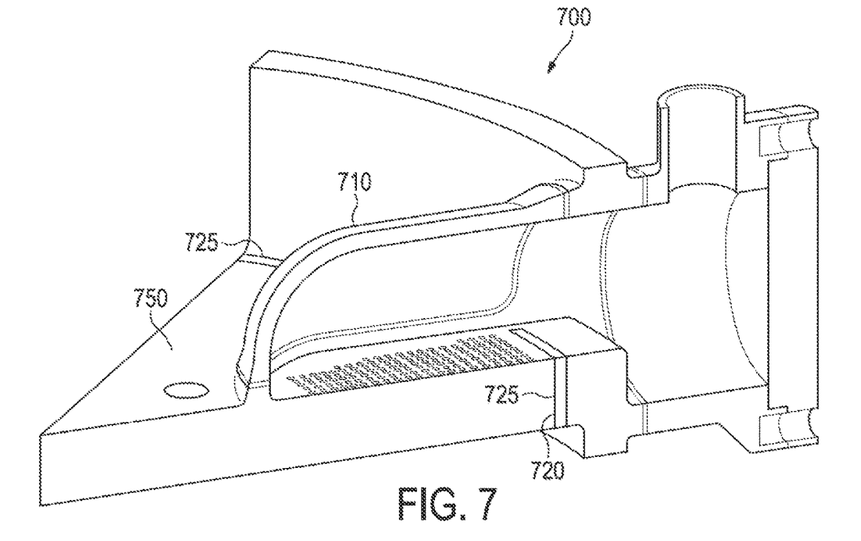
FIG. 7 illustrates an example integral reactor pressure vessel tube sheet attached to a reactor pressure vessel.

FIG. 7 illustrates an example integral reactor pressure vessel tube sheet 750 attached to a reactor pressure vessel 700. Reactor pressure vessel 700 may comprise an attachment ring 720 projecting inward from an inner diameter of the reactor pressure vessel 700. The attachment ring 720 may comprise a weld buildup ring, and the integral tube sheet 750 may be welded to attachment ring 720 at weld region 725. In some examples, weld region 725 may comprise a full penetration weld. Weld region 725 may extend around the entire inner diameter of reactor pressure vessel 700, and in some examples passes through one or more plenums 710.

Integral tube sheet 750 may be fabricated in an essentially disc shape. Additionally, integral tube sheet 750 may be manufactured with a low alloy steel and clad with stainless steel on both its upper and lower surfaces for corrosion resistance. Manufacturing integral tube sheet 750 with a low alloy steel core may reduce the amount of thermal expansion stresses at weld region 725, as compared to a sheet manufactured with solid stainless steel. In some examples, integral tube sheet 750 may be drilled with a number of tube holes surge flow holes, control rod drive shaft holes, and/or instrument guide tube holes prior to attaching integral tube sheet to reactor pressure vessel 700. In some examples, stainless steel sleeves may be inserted into one or more of the holes to prevent thermal cycle fatigue. Additionally, the holes may be clad with stainless steel to prevent direct exposure of the low alloy steel core to primary coolant. The upper and lower surfaces of weld region 725 and the adjacent steel core may also be back-clad with stainless steel after Integral tube sheet 750 is attached to reactor pressure vessel 700.

The outermost tube holes may be located several inches from the inner diameter of the reactor pressure vessel 700 in order to minimize distortion to the holes. In some examples, a local bump-out of the reactor pressure vessel 700 may be provided to ensure that the outermost tubes of the heat exchanger fit closely to the surrounding structure of reactor pressure vessel 700 to minimize bypass flow. In other examples, a baffle may be provided between the tube bundle and the reactor pressure vessel 700.

Attachment ring 720 may be configured to provide sufficient spacing of integral tube sheet 750 from reactor pressure vessel 700 to facilitate alignment and/or inspection of the weld head with weld region 725. For example, attachment ring 720 may have an annular thickness of several inches. Attachment ring 720 may be configured to provide a primary to secondary pressure boundary between a secondary coolant system and the reactor pressure vessel region located below integral tube sheet 750. Integral tube sheet 750 may be welded to reactor pressure vessel 700 prior to installing the steam generator tubes into the integral tube sheet 750.

Figure 8:
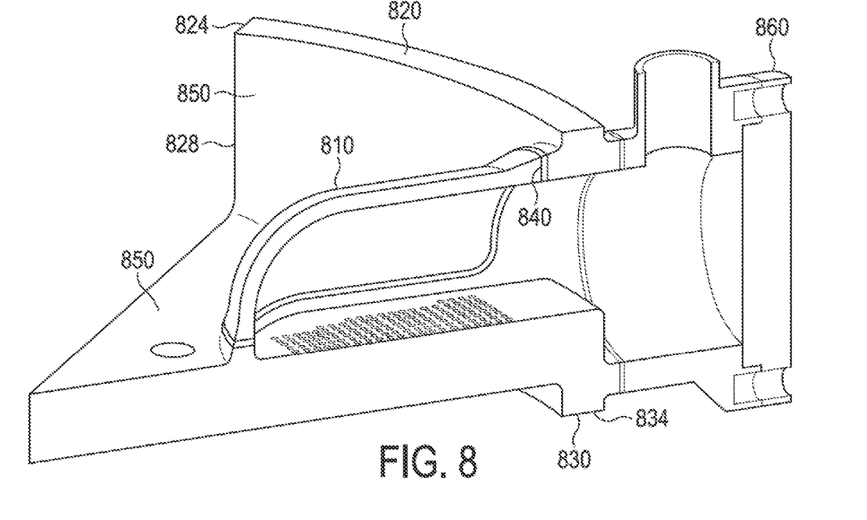
FIG. 8 illustrates an example integral reactor pressure vessel tube sheet configured to attach to both an upper portion of a reactor pressure vessel and a lower portion of the reactor pressure vessel.

FIG. 8 illustrates an example integral reactor pressure vessel tube sheet 850 configured to attach to both an upper portion of a reactor pressure vessel and a lower portion of the reactor pressure vessel. Integral tube sheet 850 may comprise one or more integral flanges, such as an upper flange 820 and a lower flange 830. Upper flange 820 may be located above the horizontal portion of integral tube sheet 850, and lower flange 830 may be located below the horizontal portion of integral tube sheet 850.

The one or more flanges may be forged on the outer diameter of integral tube sheet 850 for attachment to the reactor pressure vessel. In some examples, a top surface 824 of upper flange 820 may be welded to the upper portion of the reactor pressure vessel, and a bottom surface 834 of lower flange 830 may be welded to the lower portion of the reactor pressure vessel. The upper and lower portions of the reactor pressure vessels may be joined to each other by integral tube sheet 850. When the reactor pressure vessel is fully assembled, the upper portion of the reactor pressure vessel may be separated from the lower portion of the reactor pressure vessel according to a distance between the top surface 824 of upper flange 820 and the bottom surface 834 of lower flange 830.

In some examples, one or both of upper flange 820 and lower flange 830 may be welded to the reactor pressure vessel using circle seam welds. Integral tube sheet 850 may be welded to the reactor pressure vessel without an inner diameter weld buildup or attachment ring, such as attachment ring 720 of FIG. 7. By locating the one or more integral flanges some distance away from integral tube sheet 850, the amount of thermal/weld distortions on the tube holes may be reduced or eliminated. Accordingly, the tube holes may be located closer to the inner diameter of the reactor pressure vessel.

Upper flange 820 may comprise a side wall 828 that forms a portion of the wall of the reactor pressure vessel intermediate the upper portion of the reactor pressure vessel and the lower portion of the reactor pressure vessel. Side wall 828 may extend from the horizontal portion of integral tube sheet 850 to a height which is above plenum 810. Upper flange 820 may be tall enough to provide a weld region 840 that encompasses one or more plenums mounted on integral tube sheet 850. In some examples, a circle seam weld may be used to connect the side of plenum 810 to the reactor pressure vessel at the elevation of the steam nozzle access bores in the reactor pressure vessel. A lower portion of plenum 810 may be welded directly to integral tube sheet 850. In some examples, the side of plenum 810 may be welded to the side wall 828 of upper flange 820. Additionally, one or more tube support cantilevers may be welded to the underside of integral tube sheet 850.

The steam dome of plenum 810 may be installed on integral tube sheet 850 either before or after installing the tube assembly. Additionally, plenum 810 may comprise an end cap 860 to provide access to the interior of plenum 810 to facilitate tube installation. Other methods of manufacture and assembly as well materials of integral tube sheet 850 may be similar to integral tube sheet 750 as discussed above.

The assembly sequence for a steam generator system utilizing an integral tube sheet, such as integral tube sheet 750 or integral tube sheet 850, may comprise welding the integral tube sheet and/or the one or more plenums prior to installing the steam generator tubes. Accordingly, the heat transfer tubes may be installed into the heat exchanger with the integral tube sheet and one or more plenums already in place. In some examples, the reactor pressure vessel may be inverted such that the heat transfer tubes may be installed from the feed plenum end, and the heat exchanger may be assembled from the outermost tube column to the innermost tube column.

Figure 9:
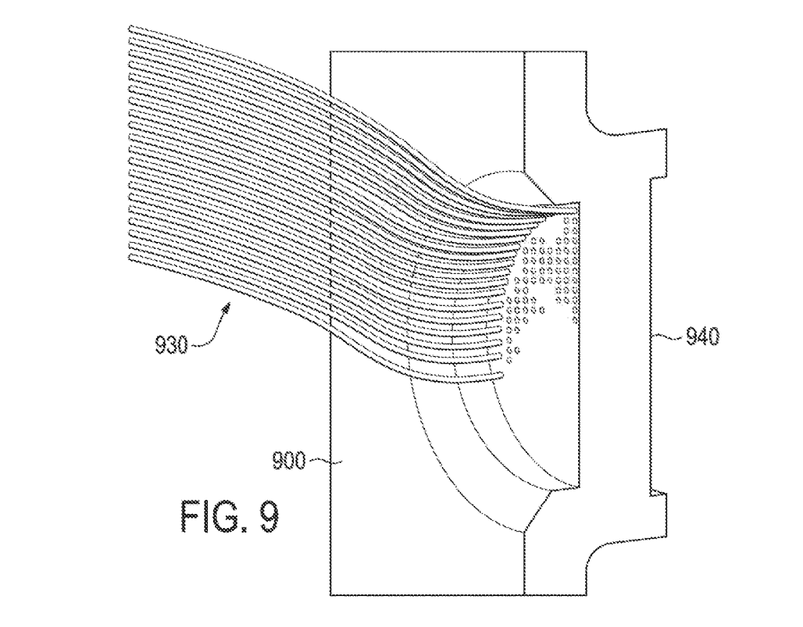
FIG. 9 illustrates an example integral reactor pressure vessel tube sheet attached to a reactor pressure vessel.

FIG. 9 illustrates an example integral tube sheet 940 attached to a reactor pressure vessel 900. In some examples, integral tube sheet 940 may comprise a circular tube sheet welded to a weld buildup on the inside surface of reactor pressure vessel 900. Integral tube sheet 940 may comprise a substantially vertical plate attached to the wall of the reactor pressure vessel 900. A plurality of heat transfer tubes 930 may pass through a number of through-holes located in plenum 900. Integral tube sheet 940 may form a portion of the wall of reactor pressure vessel 900.

Tube assembly may be performed inside reactor pressure vessel 900. Additionally, integral tube sheet 940 may be lowered onto the ends of heat transfer tubes 930 after the heat transfer tubes 930 are assembled. Integral tube sheet 940 may be used in conjunction with a second integral tube sheet located within the reactor pressure vessel. The second integral tube sheet may be located in approximately the same location within the reactor pressure vessel as one or more of the integral tube sheets illustrated in the various figures herein. The second integral tube sheet and integral tube sheet 940 may be welded to the reactor pressure vessel prior to assembling the heat exchanger. In some examples, integral tube sheet 940 may be welded to the reactor pressure vessel with conventional nozzle insert type welds.

Reactor pressure vessel 900 may be inverted for tube assembly and the heat transfer tubes 930 may first be inserted into integral tube sheet 940. One or more steam-end tube support cantilever beams may be welded to the underside of integral plate prior to tube assembly. Additionally, one or more feed-end tube support cantilever beams may be welded to the reactor pressure vessel 900 prior to tube assembly.

Assembly of the steam generator may proceed from the outermost column of tubes progressively to the innermost column of tubes, with the steam-end of the heat transfer tubes 930 inserted into the integral tube sheet, and the feed-end of the heat transfer tubes 930 inserted into integral tube sheet 940. Additionally, tube supports may be installed column by column during the heat exchanger assembly. The feed-end of the heat transfer tubes 930 may be compressed during installation into integral tube sheet 940.

Figure 10:
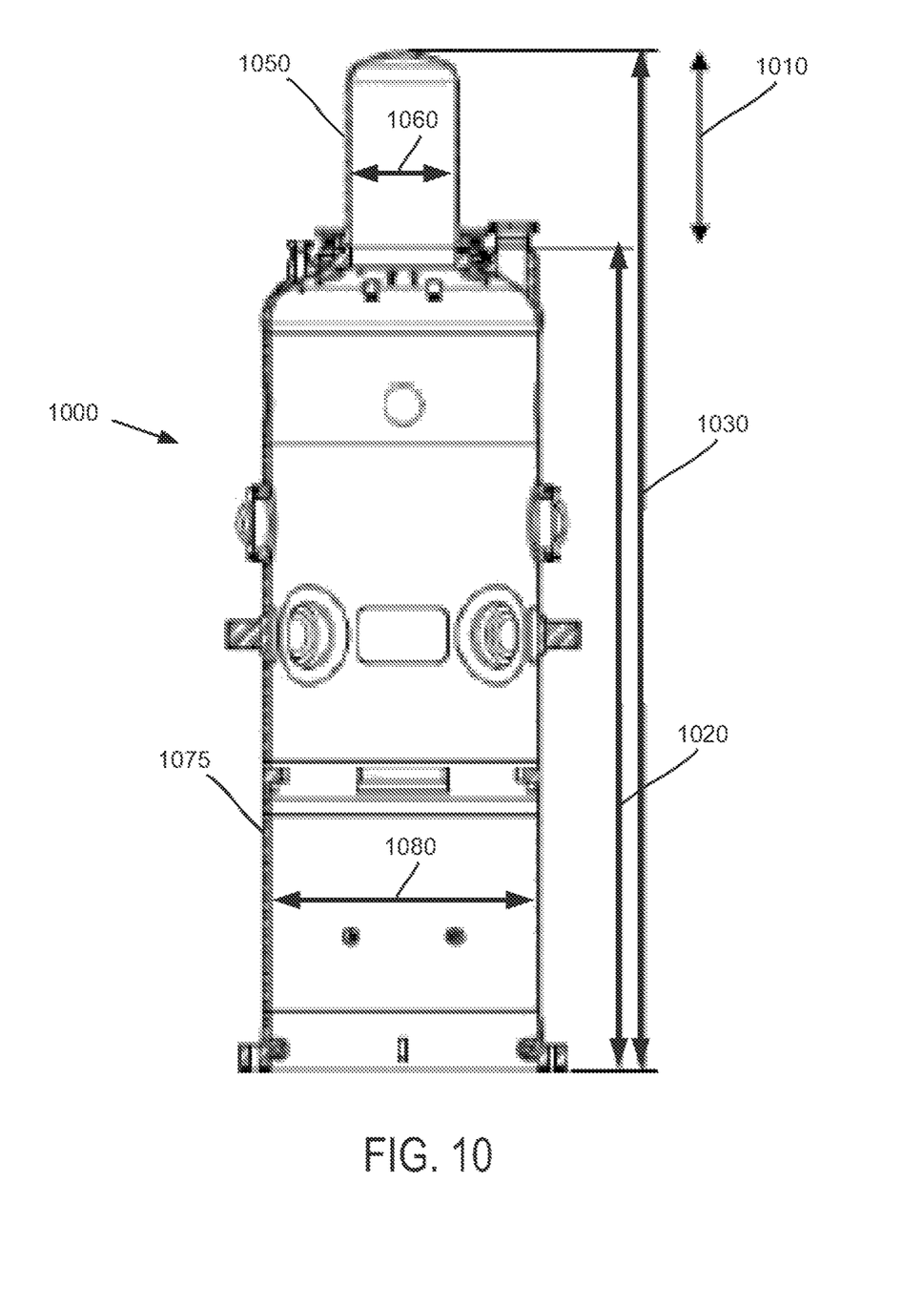
FIG. 10 illustrates an example reactor module comprising a reduced diameter upper containment vessel.

FIG. 10 illustrates an example reactor module 1000 comprising a reduced diameter upper containment vessel 1050 connected to a main containment vessel 1075. Upper containment vessel 1050 may form a nipple-shaped dome on a cylindrical-shaped lower containment vessel. The overall height 1030 of reactor module 1000 may comprise a main containment height 1020 associated with main containment vessel 1075 and an upper containment height 1010 associated with upper containment vessel 1050. Additionally, an upper containment diameter 1060 associated with upper containment vessel 1050 may be considerably smaller than a main containment diameter 1080 associated with main containment vessel 1075.

Upper containment diameter 1060 may be approximately one-third to one-half as large as main containment diameter 1080. In some examples, upper containment diameter 1060 may be less than two-thirds as large as main containment diameter 1080. In other examples, upper containment diameter 1060 may be less than one-half as large as main containment diameter 1080.

Figure 11:
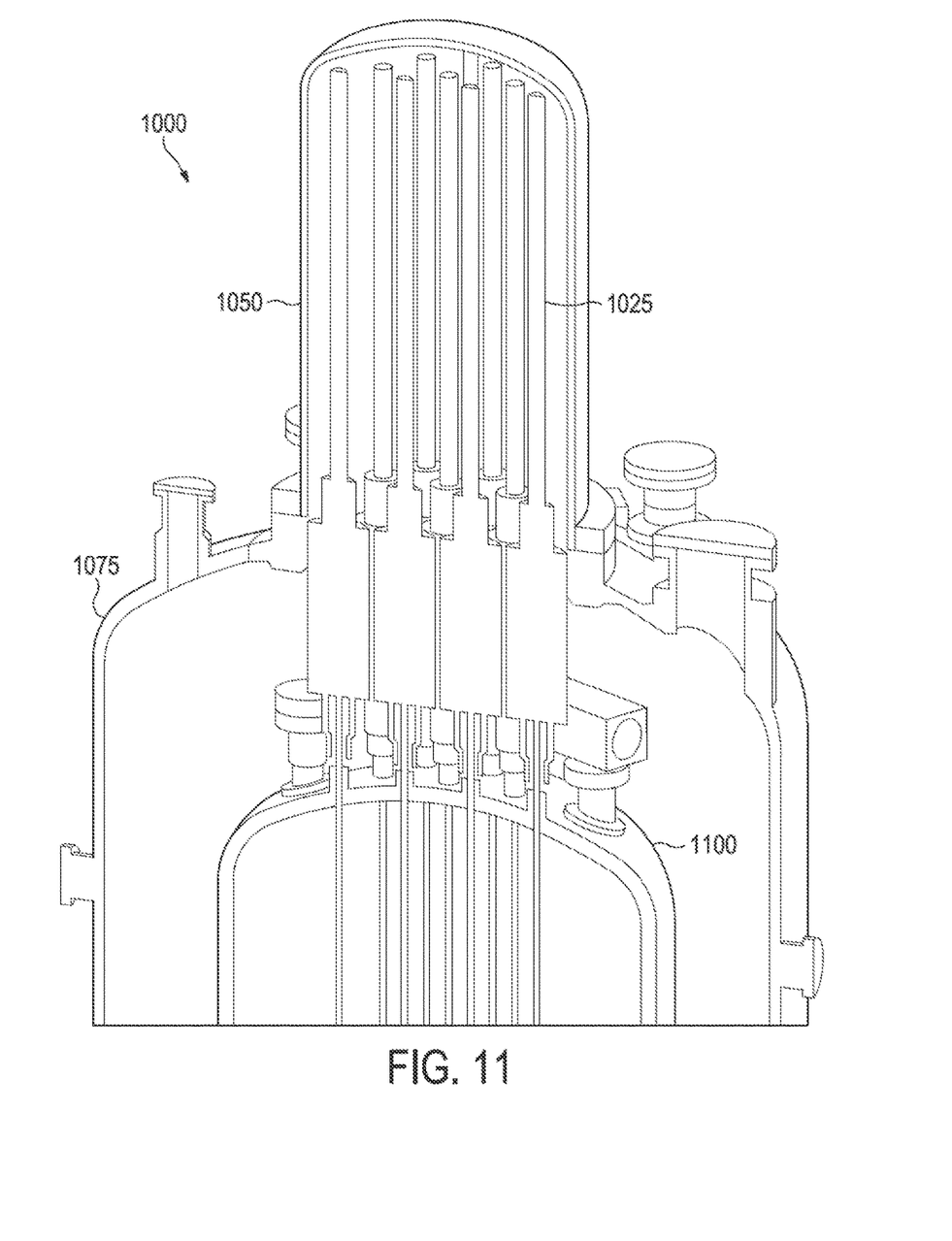
FIG. 11 illustrates a cross-sectional view of the example reactor module of FIG. 10.

FIG. 11 illustrates a cross-sectional view of the upper containment vessel 1050 of FIG. 10. Upper containment vessel 1050 may be configured to contain part of a control rod drive mechanisms 1025 located external to main containment vessel 1075. A plurality of control rods associated with control rod drive mechanisms 1025 may be suspended from upper containment vessel 1050 and pass through an integral tube sheet, such as integral tube sheet 550 (FIG. 5), located in a reactor pressure vessel 1100 housed in main containment vessel 1075.

Additionally, upper containment vessel 1050 may be configured to contain steam, feed, and primary system piping. Many of the lengths of piping in this area may include a number of bends and/or horizontal runs in order to account for thermal expansion of the piping. Relocating at least a portion of these piping into main containment vessel 1075 may reduce the distance between the thermal anchor points for the main steam (MS) and feedwater (FW) piping and similarly reduce the number of bends and horizontal piping runs. Additionally, removing a significant portion of MS and FW piping from the vicinity of the control rod drive mechanisms 1025 may reduce the amount of piping supports/constraints.

Decreasing the overall size and/or volume of reactor module 1000 may affect peak containment pressure and/or water levels. In addition to reducing the overall height 1030 (FIG. 10) of reactor module 1000, a separable containment vessel, such as upper containment vessel 1050, may further reduce the weight and shipping height of reactor module 1000. In some example reactor modules, several tons of weight can be removed for each foot that the overall height 1030 of reactor module 1000 is decreased.

Figure 12:
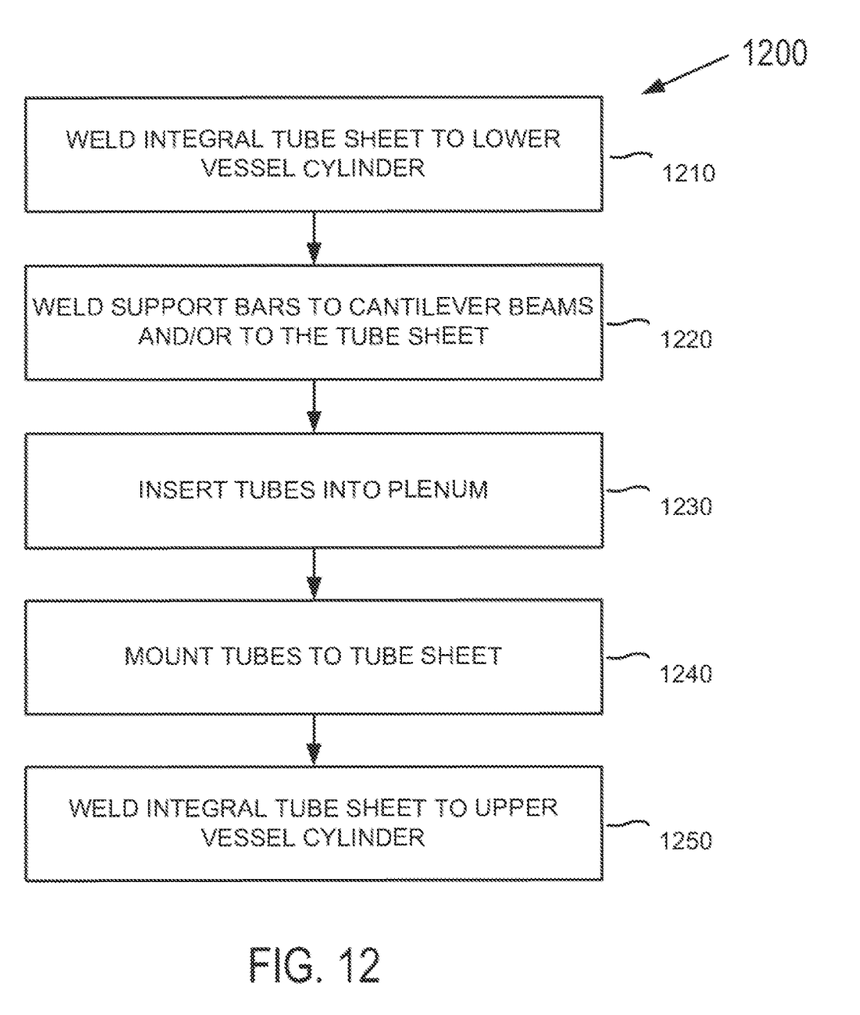
FIG. 12 illustrates an example process of assembling an integral tube sheet.

FIG. 12 illustrates an example process 1200 of assembling an integral tube sheet. At operation 1210, the integral tube sheet may be welded to a reactor pressure vessel. In some examples, the integral tube sheet may comprise a flange that is welded to a lower vessel cylinder.

At operation 1220, one or more support bars may be welded to tube sheet cantilever beams and/or directly to the integral tube sheet. The cantilever beams may comprise radial cantilever beams for a plurality of tube supports. The cantilever beams may fit under the integral tube sheet.

At operation 1230, a plurality of tubes may be inserted into a plenum located above the integral tube sheet. In some examples, the lower cylinder may be welded to the integral tube sheet flange at operation 1210 before inserting the heat transfer tubes. In some examples, the tubing operations may be performed inside the reactor pressure vessel.

At operation 1240, the heat transfer tubes may be placed into the integral tube sheet and/or supported by the plurality of tube supports.

At operation 1250, the integral tube sheet flange may be welded to an upper vessel cylinder. In some example RPV modules, an upper vessel cylinder may comprise a PZR head that is welded to the lower vessel cylinder.

Although the examples provided herein may be described and/or compatible with a pressurized water reactor, it should be apparent to one skilled in the art that the examples may be applied to other types of power systems as described or with some obvious modification. For example, the examples or variations thereof may also be made operable with a boiling water reactor, sodium liquid metal reactor, pebble-bed reactor, or a reactor designed to operate in space, such as in a propulsion system with limited operational space.

Other examples may include various nuclear reactor technologies, such as nuclear reactors that employ uranium oxides, uranium hydrides, uranium nitrides, uranium carbides, mixed oxides, and/or other types of radioactive fuel. It should be noted that examples are not limited to any particular type of reactor cooling mechanism, nor to any particular type of fuel employed to produce heat within or associated with a nuclear reactor. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A reactor pressure vessel comprising:
a substantially cylindrical shaped wall including an upper reactor pressure vessel region and a lower reactor pressure vessel region;
a plate having a substantially circular shape and attached to and extending completely across a cylindrical inside surface of the wall of the reactor pressure vessel, wherein the plate separates the upper reactor pressure vessel region from the lower reactor pressure vessel region, and creates a thermal barrier between a pressurized volume located within the upper reactor pressure vessel region and primary coolant located within the lower reactor pressure vessel region; and
one or more plenums including multiple holes extending through the plate, and a dome extending up from the plate and over the multiple holes in the upper reactor pressure vessel region and connecting around an opening in the wall of the reactor pressure vessel, the multiple holes receiving a plurality of heat transfer tubes that pass through the plate and through the opening in the wall of the reactor pressure vessel.

2. The system of claim 1, wherein the upper reactor pressure vessel region contains at least a portion of either one or both of a chemical volume control system or an emergency core cooling system, and wherein the lower reactor pressure vessel region contains a reactor core submerged in the primary coolant.

3. The system of claim 1, wherein the one or more plenums are attached to the plate, and wherein the plurality of heat transfer tubes are connected to the plate below the one or more plenum.

4. The system of claim 1, wherein the plate comprises a substantially horizontal plate attached to the wall of the reactor pressure vessel, and wherein the plurality of heat transfer tubes pass through a number of through-holes located in the horizontal plate.

5. The system of claim 1, wherein the plate comprises an upper flange that mounts to the upper reactor pressure vessel region and a lower flange that mounts to the lower reactor pressure vessel region.

6. The system of claim 5, wherein the plate separates a pressurized fluid located above the plate in the upper reactor pressure vessel region from reactor coolant system fluid located below the plate in the lower reactor pressure vessel region.

7. The system of claim 5, wherein the upper flange forms a portion of the wall of the reactor pressure vessel intermediate the upper reactor pressure vessel region and the lower reactor pressure vessel region.

8. The system of claim 5, wherein a side wall of the upper flange extends from the plate to a height which is above the one or more plenum.

9. The system of claim 8, wherein a lower portion of the one or more plenums is welded to the plate, and wherein a side of the one or more plenums is welded to the side wall of the upper flange.

10. The system of claim 5, wherein the upper reactor pressure vessel region is welded to a top surface of the upper flange; and wherein the lower reactor pressure vessel region is welded to a bottom surface of the lower flange.

11. The system of claim 1, wherein the plate comprises a number of orifices that are configured to controllably allow the primary coolant to pass through the plate into the upper reactor pressure vessel region and to re-circulate back into the lower reactor pressure vessel region.

12. The system of claim 11, wherein the orifices when closed prohibit the primary coolant from passing through the plate.

13. The system of claim 11, wherein the heat transfer tubes are configured to allow a secondary coolant from a steam generation system to pass through the plate and into the lower reactor pressure vessel region.

14. The system of claim 13, wherein both the primary coolant and the secondary coolant pass through the plate without becoming comingled.

15. The system of claim 1, wherein the one or more plenums comprise a substantially vertical plate attached to the wall of the reactor pressure vessel, and wherein the plurality of heat transfer tubes pass through a number of through-holes located in the vertical plate.

16. The system of claim 15, wherein the vertical plate forms a portion of the wall of the reactor pressure vessel.

17. The system of claim 1, further comprising a containment vessel configured to house the reactor pressure vessel, wherein an outer diameter of an upper portion of the containment vessel located above the plate is smaller than an outer diameter of a lower portion of the containment vessel.

18. The system of claim 17, wherein the outer diameter of the upper portion of the containment vessel is less than one-half as large as the outer diameter of the lower portion of the containment vessel.

19. The system of claim 17, further comprising a plurality of control rods which are suspended from the upper portion of the containment vessel and pass through the plate into the lower reactor pressure vessel region located within the lower portion of the containment vessel.

20. The system of claim 17, wherein the upper portion of the containment vessel forms a nipple-shaped dome on a cylindrical-shaped lower portion of the containment vessel.

* * * * *

UNITED STATES PATENT AND TRADEMARK OFFICE
CERTIFICATE OF CORRECTION

PATENT NO. : 9,997,262 B2
APPLICATION NO. : 14/260866
DATED : June 12, 2018
INVENTOR(S) : Liszkai et al.

It is certified that error appears in the above-identified patent and that said Letters Patent is hereby corrected as shown below:

On the Title Page

Item (72), fourth inventor, MATTHEW MALLETT, should read MATTHEW MALLET.

Signed and Sealed this
Twenty-first Day of April, 2020

Andrei Iancu
*Director of the United States Patent and Trademark Office*